Patented June 30, 1925.

1,544,293

UNITED STATES PATENT OFFICE.

EDWARD R. BERRY, OF MALDEN, MASSACHUSETTS, ASSIGNOR TO GENERAL ELECTRIC COMPANY, A CORPORATION OF NEW YORK.

QUARTZ WORKING.

No Drawing.  Application filed April 18, 1923. Serial No. 633,018.

*To all whom it may concern:*

Be it known that I, EDWARD R. BERRY, a citizen of the United States, residing at Malden, in the county of Middlesex, State of Massachusetts, have invented certain new and useful Improvements in Quartz Working, of which the following is a specification.

The present invention relates to the production of articles from clear quartz glass, and it is of particular utility for the production of optical devices such as lenses or prisms.

Clear transparent quartz glass may be made by fusing crystal quartz in a mineral-free carbonaceous container in a vacuum and then subjecting the vacuum-fused product to pressure. As described and claimed in a Patent No. 1,536,821 issued to Philip K. Devers on May 5, 1925, and in a co-pending application Serial No. 457,660, filed by Levi B. Miller, quartz strip or cane may be produced by extruding fused quartz glass from an orifice in a graphite container. The quartz cane thus produced is clear and substantially free from bubbles. I have found that when cane thus produced is built up into quartz ware, such as plates, by the aid of the oxyhydrogen blow-pipe or electric arc, that the finished article contains striæ having different optical properties from the main body of the material. The material constituting the striæ is transparent but evidently has optical properties differing from pure quartz. Apparently they are constituted by a surface layer of quartz on the quartz cane which either has combined with a small proportion of carbon, or contains in a solution a reduction product such, for example, as silicon monoxide.

In accordance with my invention, this surface layer of different chemical constitution upon the quartz cane is removed before the same is worked up into quartz ware, either mechanically or by treatment with a solvent.

A convenient way of removing the surface layer is a washing treatment with a solution of hydrofluoric acid in water. When treating quartz cane of about ¼" diameter, the cane is immersed in a 48% solution of hydrofluoric acid until a shell about five thousandths of an inch thick is removed.

Cane washed in the above manner does not leave a line of demarcation, where it comes in contact with other cleaned fused quartz cane, and consequently it would lend itself very readily to the process of making silica tubing by machine operation where the cane is wrapped while plastic in a closed spiral on a mandrel and subsequently rolled or smoothed into a uniform, homogeneous article. This method of making tubes from quartz cane is described and claimed in my Patent No. 1,482,455 issued on February 5, 1924. However, my present invention is not limited to the manufacture of tubes, clear lenses and other quartz ware may be made to advantage from quartz cane treated as herein described.

What I claim as new and desire to secure by Letters Patent of the United States, is:—

1. The method of making quartz ware from clear quartz cane, which has been acted upon by carbon at high temperature, which consists in removing a surface layer of the cane and then building up desired quartz ware from said cane in a plastic state.

2. The method of making quartz ware from clear quartz cane which has been acted upon by carbon at a reaction temperature which consists in treating said cane with hydrofluoric acid and then building up the cane by fusion into desired form.

3. The step in the method of making quartz ware from clear quartz fused in a carbonaceous environment which consists in removing a surface layer which has been in contact with carbon vapor.

4. The method of preventing the formation of striæ in articles made from clear quartz which has been fused in the presence of carbon which consists in removing from said quartz a surface layer of about five thousandths of an inch in thickness before said quartz is fashioned into the desired articles.

In witness whereof, I have hereunto set my hand this 14th day of April, 1923.

EDWARD R. BERRY.